US007485854B2

(12) United States Patent
Hartonen et al.

(10) Patent No.: US 7,485,854 B2
(45) Date of Patent: Feb. 3, 2009

(54) SAMPLING DEVICE FOR INTRODUCTION OF SAMPLES INTO ANALYSIS SYSTEM

(75) Inventors: Kari Hartonen, Vantaa (FI); Kari Kuuspalo, Helsinski (FI); Heikki Lihavainen, Porvoo (FI); Pasi Aalto, Helsinki (FI); Markku Rasilainen, Helsinki (FI); Marja-Liisa Riekkola, Espoo (FI); Markku Kulmala, Helsinki (FI); Yrjo Viisanën, Helsinki (FI)

(73) Assignees: University of Helsinki, Department of Chemistry, Laboratory of Analytical Chemistry, Helsinki (FI); University of Helsinki, Department of Physical Science, division of Atmospheric Sciences, Helsinki (FI); Finnish Meteorological Instutute, Helsinki (FI)

( * ) Notice: Subject to any disclaimer, the term of this patent is extended or adjusted under 35 U.S.C. 154(b) by 317 days.

(21) Appl. No.: 11/438,689

(22) Filed: May 23, 2006

(65) Prior Publication Data

US 2007/0275474 A1 Nov. 29, 2007

(51) Int. Cl.
*B01D 59/44* (2006.01)
*H01J 49/00* (2006.01)

(52) U.S. Cl. ....................... 250/288; 250/307; 250/308; 250/309; 250/423 R; 250/426; 250/492.21; 250/340; 250/339.12; 436/155; 436/45; 436/95; 435/6; 435/270; 435/287.2; 73/31.02; 73/28.02; 73/864.71

(58) Field of Classification Search ................. 250/288, 250/307, 308, 309, 423 R, 426, 492.21, 340, 250/339.12; 436/155, 45, 95; 435/6, 270, 435/287.2; 73/31.02, 28.02, 864.71
See application file for complete search history.

(56) References Cited

U.S. PATENT DOCUMENTS

| | | | | |
|---|---|---|---|---|
| 4,963,736 | A | 10/1990 | Douglas et al. | |
| 6,558,630 | B1 | 5/2003 | Degn et al. | |
| 2003/0034450 | A1 | 2/2003 | Karger et al. | |
| 2005/0126260 | A1* | 6/2005 | Totoki | 73/31.02 |

FOREIGN PATENT DOCUMENTS

| | | | | |
|---|---|---|---|---|
| EP | 1 137 043 | A1 | | 9/2001 |
| JP | 2000-28596 | | | 1/2000 |
| WO | WO 96/10736 | A1 | | 4/1996 |
| WO | WO 03/074154 | A1 | | 9/2003 |
| WO | WO 3074154 | A1 | * | 9/2003 |

OTHER PUBLICATIONS

World Intellectual Property Organization website http://www.wipo.int—search for document WO 2007/135554 "Sampling Device for Introduction of Samples into Analysis System" . A copy of search results provided with this office action.*

(Continued)

*Primary Examiner*—Jack I. Berman
*Assistant Examiner*—Meenakshi S Sahu
(74) *Attorney, Agent, or Firm*—Arent Fox LLP

(57) ABSTRACT

A sampling device, for example a sampling valve, is disclosed for introduction of samples into an analysis system. The sampling device comprises a turning element provided with a sampling area. The sampling area is configured to retain samples to be analysed. The turning element is arranged for movement between a first position where the sampling area is exposed to material to be sampled for collection of samples and a second position where samples are released for use by the analysis system.

33 Claims, 5 Drawing Sheets

OTHER PUBLICATIONS

T. Laitinen et al., "Novel Aerosol for Introducing Ultrafine Aerosol Samples to Mass Spectrometric Analysis in Near Real-Time", pp. 1-29.

Orsnes et al., "A Rotating Ball Inlet for On-Line MALDI Mass Spectrometry", 2000, 72:251-254, Anal. Chem.

Harrison K. Musyimi et al., "Online CE-MALDI-TOF MS Using a Rotating Ball Interface", 2004, 76:5968-5973, Anal. Chem.

David M. Stieb et al., "Meta-Analysis of Time-Series Studies of Air Pollution and Mortality: Effects of Gases and Particles and the Influence of Cause of Death, Age and Season", 2002, ISSN 1047-3289, J. Air & Waste Manage. Assoc. 52:470-484.

Klaus-Peter Hinz et al., "Laser-Induced Mass Analysis of Single Particles in the Airborne State", Anal. Chem., 1994, 66:2071-2076.

Olivier P. Haefliger et al. "Laser Mass Spectrometric Analysis of Polycyclic Aromatic Hydrocarbons with Wide Wavelength Range Laser Multiphoton Ionization Spectroscopy", Anal. Chem. 1998, 70:2660-2665.

Zhaozhu Ge et al., "Laser Desorption/Ionization of Single Ultrafine Multicomponent Aerosols", Environ. Sci. Technol., 1998, 32:3218-3223.

Ramakrishna V. Mallina et al., "High Speed Particle Beam Generation: A Dynamic Focusing Mechanism for Selecting Ultrafine Particles", Aerosol Sci. and Tech. 33: 87-104, 2000.

U. Lohmann et al., "Global Indirect Aerosol Effects: A Review" Atmos. Chem. Phys., 5:715-737, 2005.

M. Kulmala et al., "Formation and Growth of Ultrafine Atmospheric Particles: A Review of Observations", Aerosol Sci. 35:143-176, 2004.

M.J. Dale et al., "Direct Analysis of Polycyclic Aromatic Hydrocarbons in Cloud-Water Aerosol Filtrates Using Laser Desorption Mass Spectrometry", Environmental Pollution, vol. 89, No. 2, pp. 123-129, 1995.

Piia Anttila et al., "Determination of Organic Acids In Aerosol Particles From A Coniferous Forest By Liquid Chromatography-Mass Spectrometry", J. Sep. Sci. 2005, 28:337-346.

B.D. Morrical et al., "Coupling Two-Step Laser Description/Ionization with Aerosol Time-of-Flight Mass Spectrometry for the Analysis of Individual Organic Particiles", 1998 J Am Soc. Mass. Spectrom 1998, 9, 1068-1073.

James N. Smith et al., "Chemical Composition At Atmospheric Nanoparticles During Nucleation Events in Atlanta", J. Geophys. Res., 110, D22S03, doi:10.1029/2005JD005912, 2005.

J.N. Smith, et al., "Atmospheric Measurements of Sub-20 mm Diameter Particle Chemical Composition by Thermal Desorption Chemical Ionization Mass Spectrometry", Aerosol Sci. and Tech., 38:100-110, 2004.

Christian Emmenegger, et al., "High Time Resolution and Size-Segregated Analysis of Aerosol-Bound Polycyclic Aromatic Hydrocarbons", Environ. Sci. Technol. 2005, 39, 4213-4219.

Michael J. Cogglia, et al., "Airborne Deployment of an Instrument for Real-Time Analysis of Singel Aerosol Particles", Aerosol Sci. and Tech 33:20-29 (2000).

David G. Nash et al., "Aerosol Mass Spectrometry: An Introductory Review", International Journ. of Mass Spectrometry 258 (2006) 2-12.

Xun Fei et al., "Aerosol MALDI with a Reflectron Time-of-Flight Mass Spectrometer", Anal., Chem. 1996, 68:1143-1147.

Henrik Orsnes et al., "A Rotating Bell Inlet for On-Line MALDI Mass Spectrometry", Anal. Chem. 2000, 72:251-254.

Pierre Voumard, "A New Instrument for Spatially Resolved Laser Desorption/Laser Multiphoton Ionization Mass Spectrometry", Rev. Sci. Instrum. 64 (8), Aug. 1993, pp. 2215-2220.

Da-Ren Chen et al., "A High Efficiency, High Throughput Unipolar Aerosol Charger for Nanoparticles", Journ. of Nanoparticle Res., 1:115-126, 1999.

Giuseppe A. Petrucci et al., "A Differently Pumped Particle Inlet for Sampling of Atmospheric Aerosols Into a Time-of-Flight Mass Spectrometer: Optical Characterization of the Particle Beam".

Sylvia H. Wood et al., "Time-of-Flight Mass Spectrometry Methods for Real Time Analysis of Individual Aerosol Particles", Trends in Analytical Chemistry, vol. 17, No. 6, pp. 346-356, 1998.

D. Voisin et al., "Thermal Desorption Chemical Ionization Mass Spectrometer for Ultrafine Particle Chemical Composition", Aerosol Sci. and Tech. 37:471-475 (2003).

Todd M. Allen et al., "Screening of Aerosol Filter Samples for PAHs and Nitro-PAHs by Laser Desorption Ionization TOF Mass Spectrometry", Aerosol Sci. and Tech. 30:288-299 (1999).

Dawit Z. Bezbeh et al., "Screening of Aerosol Filter Samples for PAHs and Nitro-PAHs by Laser Desorption Ionization TOF Mass Spectrometry", Aerosol Sci. and Tech. 30:288-299 (1999).

Murray V. Johnson, "Sampling and Analysis of Individual Particles By Aerosol Mass Spectrometry", J. Mass. Spectrom. 35:585-595 (2000).

Henrik Orsnes, "Rotating Bell Inlet for Continuous Mass Spectrometric Monitoring of Aqueous Solutions", Rapid Communications in Mass Spectrometry, vol. 12, 11-14 (1998).

Lianhong Gu et al., "Response of Deciduous Forest to the Mount Pinatubo Eruption: Enhanced Photosynthesis", Science, vol. 299, pp. 2035-2038, Mar. 28, 2003.

Eric Gard et al., "Real-Time Analysis of Individual Atmospheric Aerosol Particles: Design and Performance ofa Portable ATOFMS", Anal. Chem. 1997, 69:4083-4091.

M. Kalberer et al., "Picogram Quantitation of Polycyclic Aromatic Hydrocarbons Adsorbed on Aerosol Particles By Two-Step Laser Mass Spectrometry", Anal. Chem. 2002, 74:3292-3497.

Masahiko Shimmo et al., "Particle Size Distribution and Gas-Particle Partition of Polycyclic Aromatic Hydrocarbons in Helsinki Urban Area", Journ. of Atmospheric Chem., 47:223-241,2004.

Shelley N. Jackson et al., "On-line Laser Desorption/Ionization Mass Spectrometry of Matrix-Coated Aerosols", Rapid Commun. Mass Spectrom. 2004, 18:2041-2045.

Peter G. Carson et al., "On-Line Chemical Analysis of Aerosols by Rapid Single-Particle Mass Spectrometry", J. Aerosol Sci., vol. 26, No. 4, pp. 535-545, 1995.

A. Trimborn et al., "Online Analysis of Atmospheric Particles with a Transporatable Laser Mass Spectrometer", Aerosol Sci. and Tech., 33:191-201 (2000).

David B. Kane et al., "Nanoparticle Detection by Aerosol Mass Spectrometry", Aerosol Sci. and Tech. 34:520-527 (2001).

Peng Liu, et al., "Generating Particle Beams of Controlled Dimensions and Divergence: II. Experimental Evaluation of Particle Motion in Aerodynamic Lenses and Nozzle Expansions", Aerosol Sci .and Tech., 22:314-324 (1995).

Peng Liu, et al., "Generating Particle Beams of Controlled Dimensions and Divergence: I. Theory of Particle Motion in Aerodynamic Lenses and Nozzle Expansions", Aerosol Sci and Tech., 22:293-313 (1995).

Jurgen J. Gross, "Electron Ionization", Mass Spectrometry, Chapter 5, pp. 193-222 (2004).

William C. Hinds, "Electrical Properties", Aerosol Technology, Chapter 15, pp. 316-348 (1999).

* cited by examiner

SAMPLING DEVICE FOR INTRODUCTION OF SAMPLES INTO ANALYSIS SYSTEM

FIELD OF THE INVENTION

The present invention relates generally to analysis of samples and in particular, but not exclusively, to introduction of solid or liquid samples into analysis of the chemical composition thereof. The invention is useful, for example, in introduction of samples of small particles floating in an atmosphere into an analysis chamber of an analysis instrument.

BACKGROUND OF THE INVENTION

Analysis of the composition of particles in gaseous atmosphere may be required in various occasions. For example, it is known that various particles in the earth's atmosphere have major impact to the climate. In addition of giving information regarding the impact of particles to the climate, an appropriate analysis can be used to monitor, for example, air quality, existence of chemical and biological weapons, drugs, emissions e.g. from industry and vehicles, and other particle type materials such as viruses, bacteria and so forth.

Analysis of particles can be based on various techniques. For example, mass spectrometry is widely employed in chemical analysis of particles. The samples for the analysis may be, for example, liquid samples, gas samples, particles in gas, particles in liquid, solid samples, samples of biological material such as molecules, bacteria and viruses and so forth.

Analysis of chemical composition of particles is typically, although not necessarily, performed by a specific analysis instrument. To be able to analyse particles by the instrument it is typically necessary to disperse a solid, bulk volume of particles to separate out the particles from the medium where they are floating and then collect the particles in preparation for subsequent analytical procedures. In a known arrangement, samples are introduced to a vacuum analysis chamber by pushing a rod which has the sample in the other end manually through a sealing element (vacuum lock). The sample is collected onto the rod from a gas outside the chamber where after the rod is pushed into the analysis chamber.

A possibility is to let gas or other flowing material to flow through the analysis chamber and try to hit to the particles therein by a laser beam. The flow into the analysis chamber can be controlled by opening and closing in a pulsed manner an appropriate valve arrangement in the inlet to the chamber.

A problem with the prior art has been the lack of automation in the introduction of samples to a vacuum analysis chamber. Instead, the samples need to be introduced manually. A problem relates to the lack of possibility of collecting samples and analysing them substantially in real time and/or in a continuous manner. More particularly, if a sample is collected beforehand, such as by means of the above mentioned collecting rod, and because of the time it takes before the sample can be analysed, a chemical composition of the sample may change, which may affect the outcome of the analysis. Furthermore, there is a need for general improvements in the sample collection process in view of the effectiveness, performance and controllability of sample collection.

SUMMARY OF THE INVENTION

In accordance with an embodiment, there is provided a sampling device for introduction of samples into an analysis system. The sampling device comprises a turning element provided with a sampling area, said sampling area being configured to retain samples to be analysed. The turning element is arranged for movement between a first position where the sampling area is exposed to material to be sampled for collection of samples and a second position where samples are released for use by the analysis system.

In accordance with another embodiment, there is provided a method for providing samples for an analysis. The method comprises collecting a sample on a sampling area of a sampling element in a sample collection position where the sampling area is exposed to material to be sampled, turning the sampling element for moving the sampling area to another position, and releasing the sample from the sampling area for use in the analysis.

In accordance with a more specific embodiment, the turning element comprises a rotating element. The turning element may comprise a valve ball type element. The sampling area may comprise a recess, for example a discontinuity in the sphere of the turning element or a cavity in the turning element.

A multiple of sampling areas may be provided.

The turning element may be arranged for continuous collection of samples and/or for continuous rotation. Rotation may be stepwise.

The sampling device may be configured to provide a sealing element between a sample collection side and an analysis side. The sealing may be arranged to maintain a pressure difference between the sample collection side and the analysis side.

Collection of samples may be based on by at least one of charge attraction, absorption, adsorption, cold trapping, exclusion, physical filtering, adhesive force and molecular interaction.

Release of samples may be based on at least one of desorption, heating, electromagnetic radiation, solvent, charge, beam of ions or atoms, focused gas flow, sound vibrations, a shock or sudden change generated to the surface of the sampling area or to its environment.

Collection voltage may be provided on a surface of a sampling area in a controlled manner. An electrical potential difference may be selectively applied between the surface of the sampling area and a part of a sample collection chamber for providing selective particle size control.

In accordance with a yet further embodiment a sampling device for introduction of samples into an analysis system is provided. The sampling device comprises a movable sampling area, said sampling area being configured to retain samples by means of a collection voltage applied thereto. Selective particle size control is provided by control of the collection voltage.

The embodiments of the invention may provide an analysis system wherein floating particles may be sampled substantially in real time, and in any event with minimum delay. In certain embodiments simultaneous collection and analysis of samples may be provided. The collection and analysis may be made a continuous process. The analysis process may be made substantially automatic. Separation between the collection and analysis sides of the system may be provided in an efficient manner. Performance and controllability of sample collection may be improved.

BRIEF DESCRIPTION OF THE DRAWINGS

For a better understanding of the present invention and how the same maybe carried into effect, a reference will now be made by way of example only to the accompanying drawings in which.

DETAILED DESCRIPTION OF EMBODIMENTS OF THE INVENTION

Figure 1:
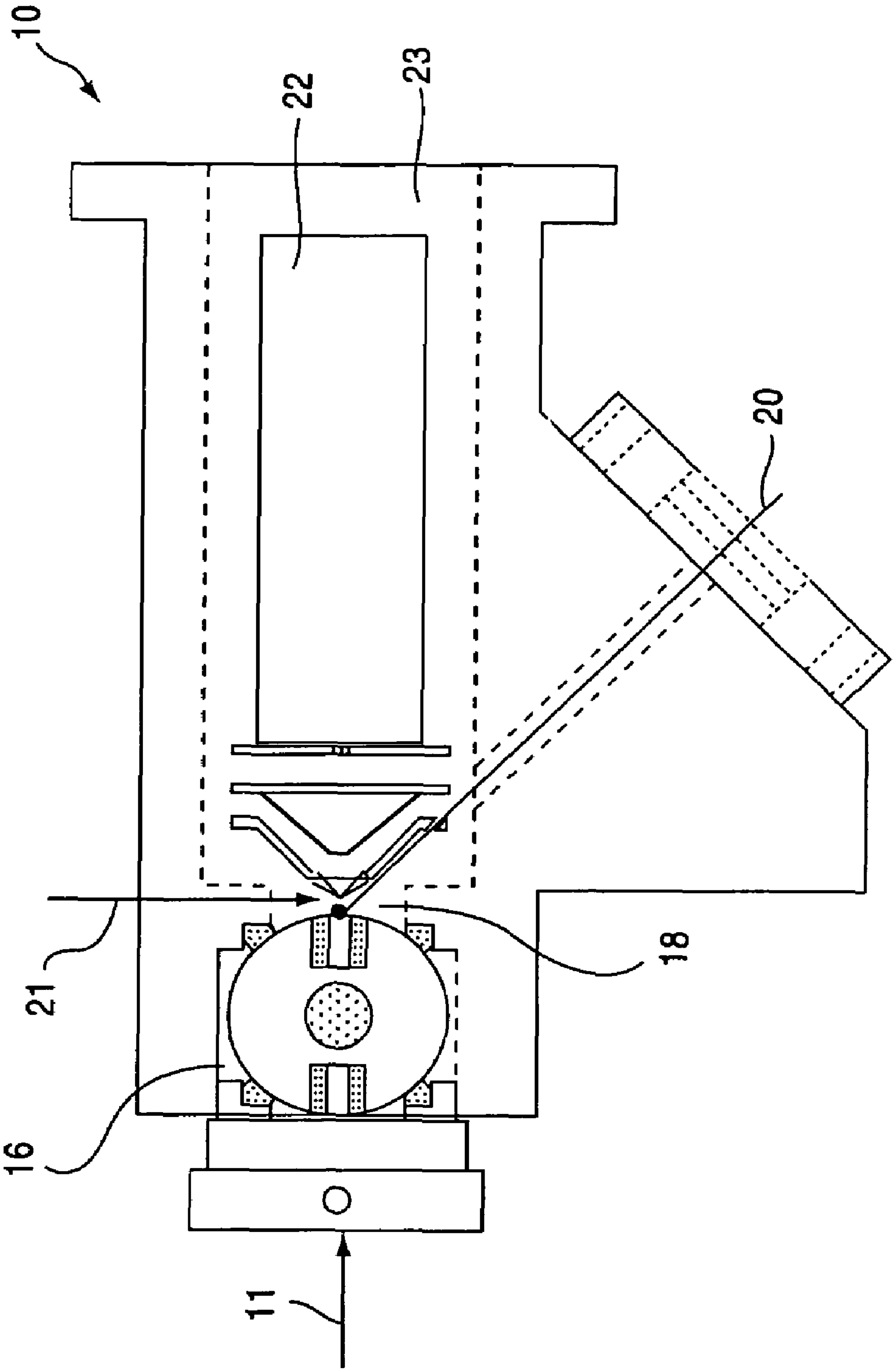
FIG. 1 shows a simplified schematic presentation of a possible analysis system.

To assist in understanding the context where a sampling device in accordance with the embodiments of the invention may be advantageously used an analysis system is described first with reference to FIG. 1. The analysis system may be provided, for example, for analysing chemical composition of particles. Such analysis is advantageous, for example, when trying to understand how new particles are formed and which substances are involved in the formation process. The analysis device may be configured to provide real time information of chemical composition of aerosol particles of any size. Aerosols are commonly understood as being solid or liquid particles in gas.

More particularly, FIG. 1 shows as an example of an analysis system a mass spectrometer arrangement 10. In the shown arrangement the analysis is based on the time of flight of ions formed from the compounds in the particles. In the shown arrangement aerosol particles in a sample flow are introduced into the device at an inlet 11. The particles may then be lead into a unipolar charger for unipolar charging. The particles of a chosen size to be analysed may then be separated from the charged aerosol stream, for example by means of a differential mobility analyser (DMA).

After the differential mobility analyser, singly charged particles of the selected size are lead in a specific sample collection device 16 for collection and introduction into the actual analysis side of the sampling device 10. More particularly, in FIG. 1 the particles are collected from the sample stream to a sampling area of a sampling valve 16. The collection may occur through an inert gas, for example a nitrogen sheath gas.

The sampling valve 16 is designed to enable collection of particles to its sampling area on the differential mobility analyser side of the instrument 10 and then substantially simultaneously, and in any event relatively soon after collection, to introduce the collected particles into analysis in the mass spectrometer side of the instrument. The introduction preferably includes release of the particles from the sampling area. A more detailed description of possible structures features of the sample collection element 16 is given below with references to FIGS. 2 to 4.

In the exemplifying mass spectrometer of FIG. 1, at the mass spectrometer side of the sampling valve 16, compounds in the particles can be desorbed in an ionisation chamber 18 from the sampling surface of the sampling valve 16. This can be provided by means of an appropriate desorption laser beam 20. The laser beam 20 may be introduced directly or in an appropriate angle to the sampling surface. For example, a pulsed infrared Nd:YAG laser 20 operated at 1064 nm may be used for this purpose.

A second laser 21, for example a short excimer laser pulse at UV range (193 nm), may be used to ionise the gas plume in the ionisation region in short distance from the desorption surface. It is noted that the second laser is only described for completeness of the arrangement of FIG. 1. The second laser may not necessarily have any direct influence on the operation of the sampling valve 16.

The ions are then fed from the ionisation chamber 18 into a flight tube 22 of the mass spectrometer. The feeding occurs via a set of acceleration lenses that are oppositely charged to ions. The ions may then be analysed according to their mass to charge ratios because of their different flight times and detected with an appropriate detector. Mass spectrum may be recorded, for example, with a multiple event time digitiser PC card of a computing unit.

A turbo pump may be connected to the bottom of the mass spectrometer vacuum chamber 23 to provide the appropriate vacuum. A pre-vacuum pump may be connected to the turbo pump and another pump may be used as interface pump for the sampling valve. A full range vacuum gauge may be attached for pressure measurement. The mass spectrometer vacuum system, the high voltage supplies and triggering of the lasers can all be controlled by means of an appropriate computer.

In the following examples of possible sampling devices exemplifying the embodiments are explained in more detail.

Figure 2:
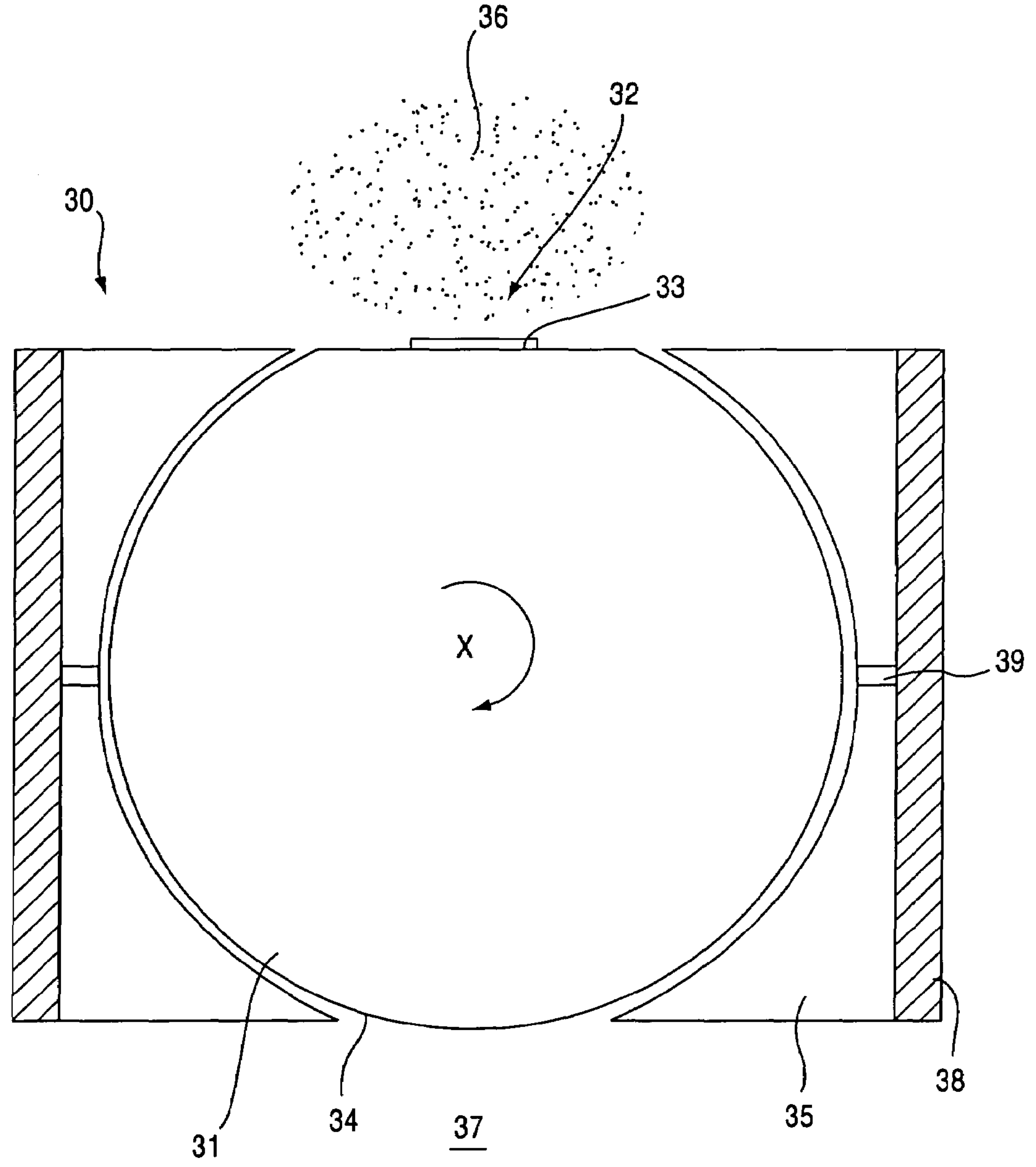
FIG. 2 shows a partially sectioned schematic presentation of a sampling device in accordance with an embodiment.

FIG. 2 shows a cross section of a possible sampling device in accordance with an embodiment. More particularly, FIG. 2 shows sectioned presentation of a ball valve type element 30. It is noted that similarly functioning system can be configured on any element suitable for rotating, for example a cylindrical valve element.

Figure 4B:
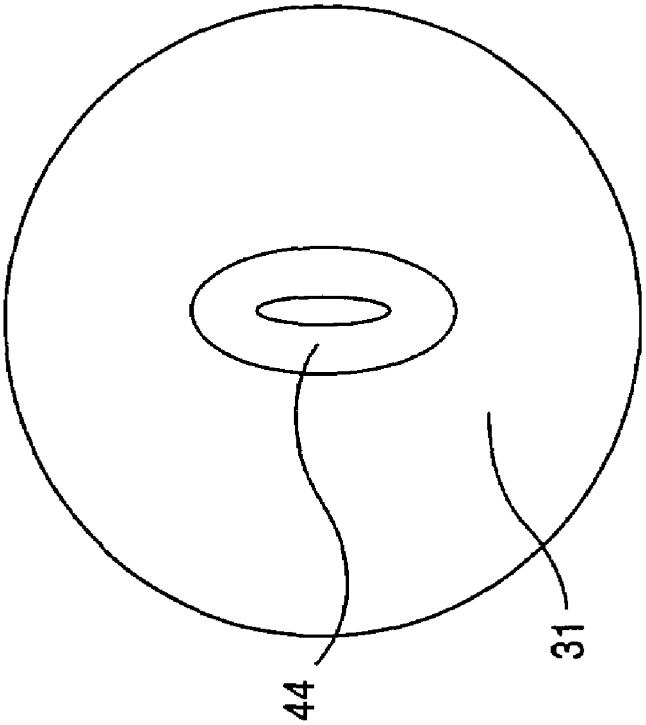
FIGS. 4A and B show partially sectioned a schematic presentations of exemplifying constructions of the turning element of a sampling device.
Figure 4A:
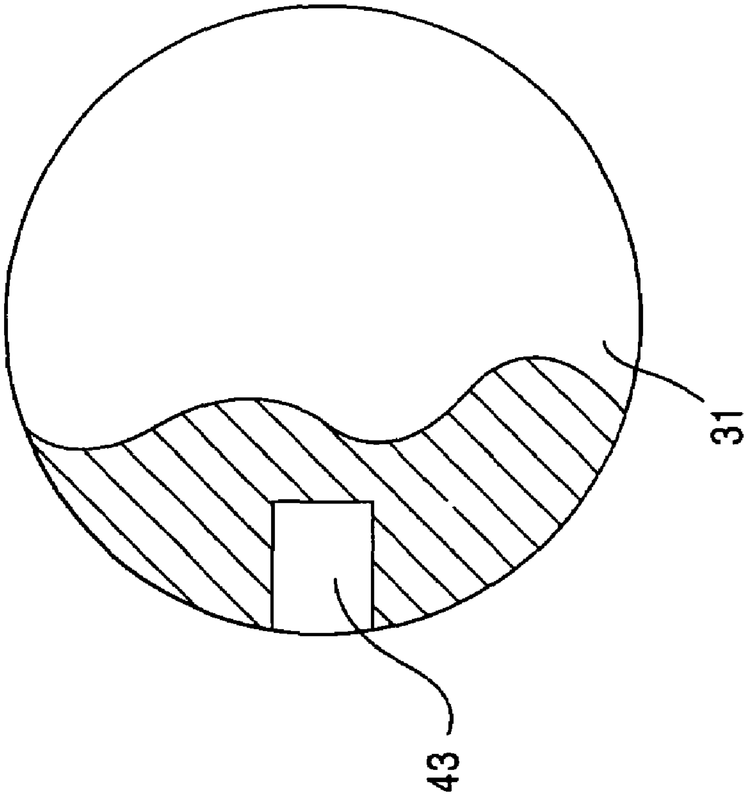

The sampling valve of FIG. 2 is configured to retain and collect solid sample particles on a sampling surface of a sampling area 32 provided on the turning ball 31 thereof. The sampling surface 33 is preferably provided such that it is below the sphere 34 of the ball 31 to enable turning of the ball with a sample on the sampling surface within the space accommodating the ball. The sampling surface may be provided simply in an area that is provided by cutting of a slice of the ball, as shown in FIG. 2, or in any appropriate recess otherwise provided on the surface of the turning ball 31. Examples of some possible alternatives are shown in FIGS. 4A and 4B.

Collection of particles on the sampling area may be effected by charge attraction. In such arrangement charged particles are collected on the sampling surface that is bearing opposite charge. Other mechanisms, for example absorption, adsorption, adhesive forces, cold trapping or exclusion (filtering into pores of the porous surface) may also be used to attract the particles onto the sampling surface. In applications where cold trapping i.e. cooling of the sampling surface is used, a cooling fluid may be conducted into the vicinity of the sampling surface through the shaft of the valve. Cooling may also be used for preventing the sample from evaporating from the sampling surface.

The sampling surface 33 can be isolated from the other parts of the ball 31 if necessary. This might be required for example when a voltage is applied to provide charge attraction or heat is applied to release the sample. Appropriate sealing can be provided by means of polymer based materials, for example, polytetrafluoroethylene (PTFE) or polyetheretherketone (PEEK). Other electrically and/or thermally non-conductive materials, such as a ceramic material, may also be used. The non-conductive material may be inserted into a cavity provided into the ball and surrounding the sampling area. The voltage to the sampling surface can be arranged to be conducted through the shaft of the ball, and therefore an electrical and vacuum insulation arrangement thereof might also be required.

The sealing may be required if the ball is made from conductive material such as a metal (for example stainless steel) or conductive polymer. According to a possibility the ball is made from a non-conductive material, and thus the sealing might not be required. For example, the ball may be made from a hard polymer, for example polyetheretherketone (PEEK).

The sampling valve 30 is configured to introduce a collected sample into the analysis side of the analysing instrument by turning the valve ball 31 between a collection position shown in FIG. 2, i.e. a position where the sampling area is exposed to the particles 36 to be sampled and a release position, i.e. a position where the sampling area is exposed to the vacuum and/or analysis side 37 of the instrument.

At the vacuum side, i.e. analysis side 37, the collected compounds can be released from the sampling surface 33 by any appropriate mechanism, for example by desorption. The release may be generated by heating, electromagnetic radiation (using, for example, laser), solvent, charge, beam of ions or atoms, focused gas flow, sound vibrations, any shock or sudden change generated to the surface of the sampling area or to its environment, and so forth.

The sampling device may also provide sealing between atmospheric pressure on the sampling side and the vacuum in the analysis side 37 of the analysis system. Appropriate sealing 35 is preferably provided between the rotating part, i.e. the ball 31 of FIG. 2, and the valve body 38 for maintaining a pressure difference between the sampling and analysing sections 36 and 37. The sealing around ball may be arranged in a non-continuous manner such that the seal is separated into two or more parts, leaving a space or gap 39 between the parts. The sealing may also be arranged by means of a one piece sealing component where the areas of the sealing surfaces are smaller than is the surface area of the ball. At least one groove or similar structure may be provided into the sealing to enhance a proper fitting of the seal around the ball. Regardless the way the fitting of the seal is arranged, it is advantageous to allow the seal(s) to expand under pressure, as otherwise the seal(s) might not be compressed efficiently enough against the surface of the ball. This may be of importance especially in applications where the force against the surface area is small to ensure good vacuum sealing.

Ball type turning element is advantageous in that it is relatively easy to provide three dimensional sealing thereof. A ball provides a relatively large surface area for sealing compared to small sample area. Any vacuum will pull the ball tightly against the seal surrounding it. The ball thus enables sealing of the collection area to all directions in a manner that would not be achievable for example by planar arrangements.

It shall, however, be appreciated that instead of a ball, the turning part of the valve can be of any appropriate shape, for example cylindrical, conical, ellipsoidal and so forth. What is important is that the turning element can be moved between a first position where samples can be collected and a second position where the samples are released for the analysis in such a manner that the time for transferring the collected samples is minimised.

Turning can be made manually or automatically by using appropriately actuated valve. The actuator device may be, for example pneumatic or electric. In a preferred embodiment a step motor is provided for the actuation. The actuator arrangement may be arranged to provide continuous operations, either such that the rotating element is turned continuously with appropriate speed or in a stepwise fashion.

Figure 3:
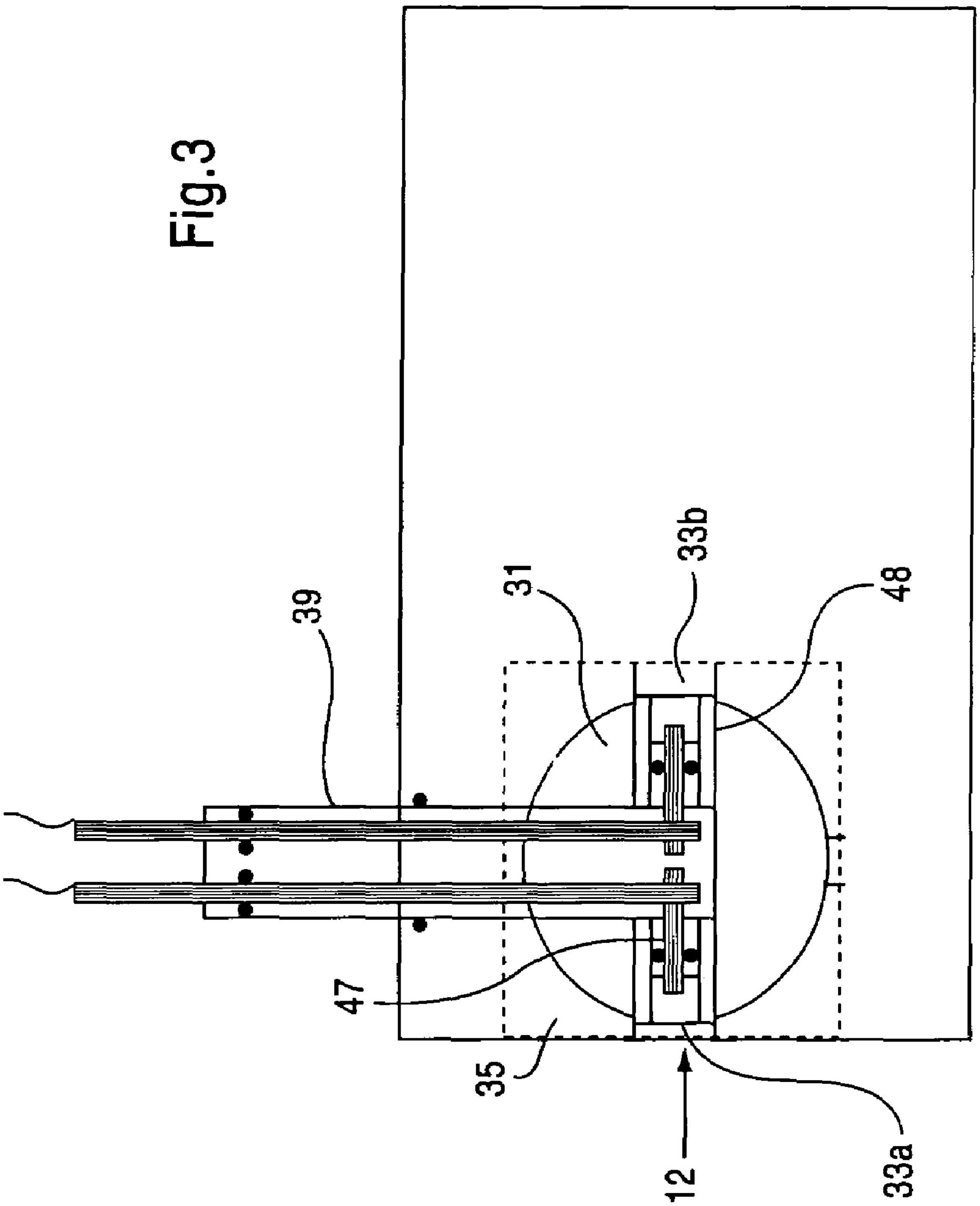
FIG. 3 shows a partially sectioned schematic presentation of a sampling device in accordance with another embodiment.

In accordance with an embodiment shown in FIG. 3 a plurality of sampling areas 33*a* and 33*b* may be provided on the rotating component 31. This may be advantageous in that a new sample may be collected at the same time as a previous sample is being analysed. It shall be appreciated that more than two sampling areas may be provided. Multiple sampling areas facilitate continuous collection of samples. The collection may occur from different separations systems or from continuous sample flow.

FIG. 3 also shows a shaft 39 of the ball. The shaft may be of the same material as the turning ball, or of different material. For example, a plastic drive shaft may be provided. A seal ring 40 may be provided on the shaft 39. It is noted that the shaft for turning the valve element may be sealed by any appropriate sealing arrangement. For example, instead or in addition to the seal ring, the space between the shaft and the guide may be filled with epoxy or the like sealant.

FIG. 3 shows also high voltage conductors 41 and 42 that extend thought the shaft and are connected to the sampling surface elements 33*a* and 33*b*.

Examples of some possible constructions of the sample collection area are shown in FIGS. 4A and B. FIG. 4A shows a circular cavity or a bore 43. The cavity may be of any other appropriate shape, for example an ellipsoidal cavity (see FIG. 4B) or a cornered cavity that is provided, for example, by drilling or milling, on the surface of the ball.

Figure 5:
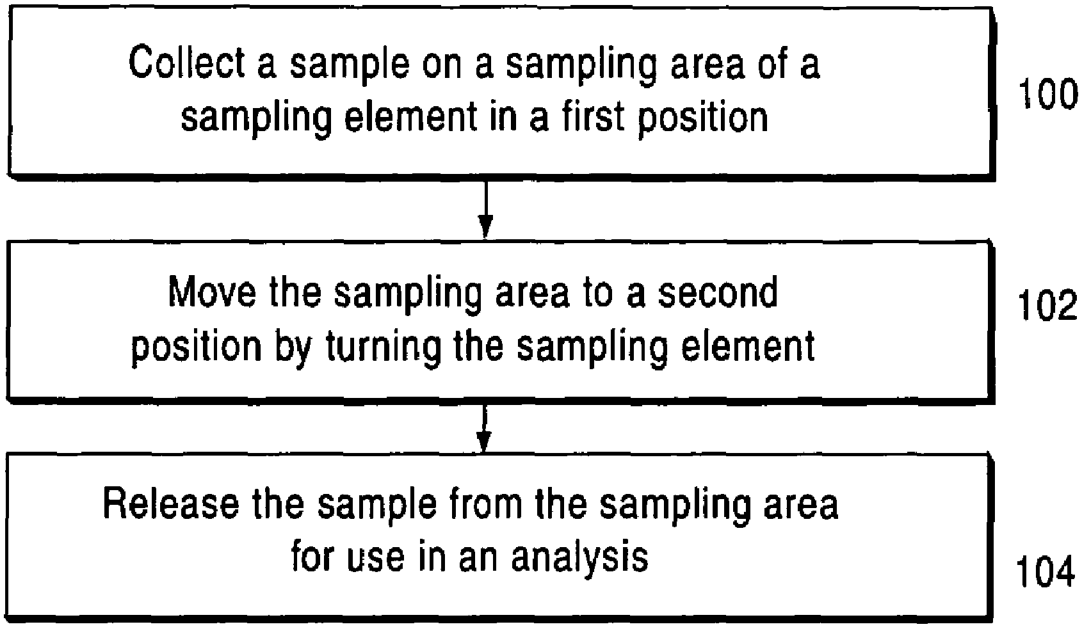
FIG. 5 shows a flow chart in accordance with an embodiment.

FIG. 5 shows a flowchart in accordance with an embodiment. In step 100, a sample is collected on a sampling area of a sampling element in a first position. In this position the sampling area is exposed to the material to be sampled, such as to the material coming from the DMA 14 of FIG. 1. Once the sample is collected, the sampling element is driven by an electric motor at step 102 so as to turn the sampling area to a second position where the sampling device is enabled to release the sample for use in the analysis. Thereafter the sample is released at step 104 from the sampling area, and the analysis thereof follows step 104.

The operation may be continuous. A plurality of sampling areas may be provided so that at least one sample is collected at the same time as another sample is being released and/or analysed. If continuous sample feeding is used together with multiple sampling spots or areas and rotating the turning element with small steps, the method can be used to feed samples from continuous sample flows from chromatography, for example.

Mixing matrix substance with the samples the method may also be used for MALDI (Matrix assisted laser desorption/ionization) also, although this may require a separate cleaning of the sample spots.

The sampling can be done in atmospheric pressure. Alternatively vacuum can be applied on the sampling side of the valve. Furthermore, although it is common in air analysis that the air sample is drawn into the chamber by vacuum so that there is no overpressure, overpressure may be used in some certain type of applications. For example, overpressure might be utilised in industry process streams or in gas emissions from car exhaust pipe. The analysis side of the valve can also be in a vacuum or atmospheric pressure. Regardless of the application, if there is a pressure difference between the two sides, the sampling device may be used as a sealing between the sampling and analysis sides of the system.

If a sample is collected by applying an electrical potential difference between the sampling surface and other part of the collection chamber, size selective collection may be provided by changing the potential difference. The particle size may be adjusted by controlling the collection voltage on the sample collection surface by an appropriate voltage control element, such as a manually operated potentiometer or a software controlled unit. Software based control of the particle size may be provided by an appropriate controller, such as a central controller unit, or by a separate particle size controller unit. In this way, the DMA part in the existing analysis system can be discarded. The principle of size selective collection the can be used in any sampling device with a sample collection area.

Additional inert gas flow can be arranged to protect the sampling surface of the movable sampling element from contamination from gas phase compounds. This may be required when, for example, air particles are collected and analysed.

The sampling element may be an integrated part of the analysis device.

The above described sampling mechanism may be applied, in addition to particles, to liquid and gas samples.

The samples may be collected from a gas or liquid flow.

The sampling surface may be of steel, stainless steel, gold, platinum or any other chemically inert electrically conductive metal or polymer. Gold and platinum are less affected by laser desorption. Porous materials, such as ceramic and silicon, are believed to be particularly good for biological samples and may be advantageously used, especially with other type of collection than charge attraction.

In the above, the examples are given with reference to mass spectrometric analysis. However, the sampling device described above may be used in other types of analysis and matters as well, such as electron microscopy and other surface analysis techniques (X-ray, Auger spectroscopy).

The above described valve is especially applicable to collecting and analysing solids, particles in gases and liquids, or gases and fluids itself.

The mechanism may be arranged such that a sample may be introduced to an analysis chamber in a number of various means.

For safety reasons, to address possible high voltages in the system, a small delay (e.g. about 10-20 s) may be provided for the vacuum to stabilize and be in appropriate levels so that the voltages can be turned on. Pressure sensitive safety switches may also be provided for high voltage supplies. However, these safety measures do not affect the analysis in any way.

Experiments:

A prototype of a ball type sampling valve has been tested in laboratory conditions. The prototype sampling valve showed good vacuum and collection properties. Only a very small and short time pressure increase was detected during the valve turning. The experiments have shown that this does not cause any problem for the mass spectrometric analysis. Desorption of the sample with short IR laser beam proved to be efficient. Collection efficiencies obtained for fine particles have proven to be particularly good. Similarly, a second valve prototype has been constructed and integrated inside a mass spectrometer ionization chamber. This second prototype showed performance as good as or even better than the first.

It is noted herein, that while the above describes exemplifying embodiments of the invention, there are several variations and modification which may be made to the disclosed solution without departing from the scope of the present invention as defined in the appended claims.

We claim:

1. A sampling device for introduction of samples into an analysis system, the sampling device comprising a turning element provided with a sampling area, said sampling area being configured to retain samples to be analysed, the turning element being arranged for movement between a first position where the sampling area is exposed to material to be sampled for collection of samples and a second position where samples are released for use by the analysis system.

2. A sampling device as claimed in claim 1, wherein the turning element comprises a rotating element.

3. A sampling device as claimed in claim 1, wherein the turning element comprises a valve ball type element.

4. A sampling device as claimed in claim 1, wherein the sampling area comprises a recess.

5. A sampling device as claimed in claim 4, wherein the recess is provided by a discontinuity in the sphere of the turning element.

6. A sampling device as claimed in claim 4, wherein the recess is provided by a cavity in the turning element.

7. A sampling device as claimed in claim 1, comprising a multiple of sampling areas.

8. A sampling device as claimed in claim 1, wherein the turning element is arranged for continuous collection of samples.

9. A sampling device as claimed in claim 1, wherein the turning element is arranged for continuous rotation.

10. A sampling device as claimed in claim 1, wherein the turning element is arranged for stepwise rotation.

11. A sampling device as claimed in claim 1, the sampling device being configured to provide a sealing element between a sample collection side and an analysis side.

12. A sampling device as claimed in claim 11, wherein the sealing is arranged to maintain a pressure difference between the sample collection side and the analysis side.

13. A sampling device as claimed in claim 1, wherein the sampling area is configured to collect samples by at least one of charge attraction, absorption, adsorption, cold trapping, exclusion, adhesive force, physical filtering and molecular interaction.

14. A sampling device as claimed in claim 1, wherein the sampling area is configured to release samples based on desorption.

15. A sampling device as claimed in claim 1, wherein the sampling area is configured to release samples by subjecting the sample to at least one of heating, electromagnetic radiation, solvent, charge, beam of ions or atoms, focused gas flow, sound vibrations, a shock or sudden change generated to the surface of the sampling area or to its environment.

16. A sampling device as claimed in claim 1, wherein the sampling device is configured to provide a flow of inert gas flow for protecting the sampling area of the movable element from contamination from gas compounds.

17. A sampling device as claimed in claim 1, wherein the sampling device is configured to control a collection voltage on the surface of the sampling area.

18. A sampling device as claimed in claim 17, the sampling device being configured to selectively apply an electrical potential difference between the surface of the sampling area and a part of a sample collection chamber for providing selective particle size control.

19. A sampling device as claimed in claim 1, wherein the sampling surface of the sampling area comprises at least one of steel, stainless steel, gold, platinum, another metal, silicon, ceramic material, polymeric material, and glass.

20. A sampling device as claimed in claim 19, wherein the material of the sampling surface is porous.

21. An analysis system comprising a sampling device for introduction of samples into an analysis system, the sampling device comprising a turning element provided with a sampling area, said sampling area being configured to retain samples to be analysed, the turning element being arranged for movement between a first position where the sampling area is exposed to material to be sampled for collection of samples and a second position where samples are released for use by the analysis system.

22. An analysis system as claimed in claim 21, comprising a mass spectrometer.

23. An analysis system as claimed in claim 21, configured to be suited for portable operation.

24. A method for providing samples for an analysis, the method comprising:

collecting a sample on a sampling area of a sampling element in a first position where the sampling area is exposed to material to be sampled;

turning the sampling element for moving the sampling area to a second position; and releasing the sample from the sampling area for use in the analysis.

25. A method as claimed in claim 24, comprising rotating the sampling element in a stepwise manner.

26. A method as claimed in claim 24, comprising collecting at least one sample at the same time as at least one other sample is being released.

27. A method as claimed in claim 24, comprising maintaining a pressure difference between a sample collection side and an analysis side by means of the sampling element.

28. A method as claimed in claim 24, wherein the step of collecting comprises collection by at least one of charge attraction, absorption, adsorption, cold trapping, exclusion, adhesive force, physical filtering and molecular interaction .

29. A method as claimed in claim 24, wherein the step of releasing comprises releasing of the sample based on at least one of desorption, heating, electromagnetic radiation, solvent, charge, beam of ions or atoms, focused gas flow, sound vibrations, and a shock or sudden change generated to the surface of the sampling area or to its environment.

30. A method as claimed in claim 24, comprising controlling a collection voltage on the surface of the sampling area.

31. A method as claimed in claim 30, comprising providing selective particle size control by selective application of an electrical potential difference between the surface of the sampling area and a part of a sample collection chamber.

32. A sampling device for introduction of samples into an analysis system, the sampling device comprising a movable sampling area, said sampling area being configured to retain samples by means of collection voltage applied thereto, wherein selective particle size control is provided by control of the collection voltage.

33. A sampling device as claimed in claim 32, the sampling device being configured to selectively apply an electrical potential difference between the surface of the sampling area and a part of a sample collection chamber.

* * * * *